UNITED STATES PATENT OFFICE.

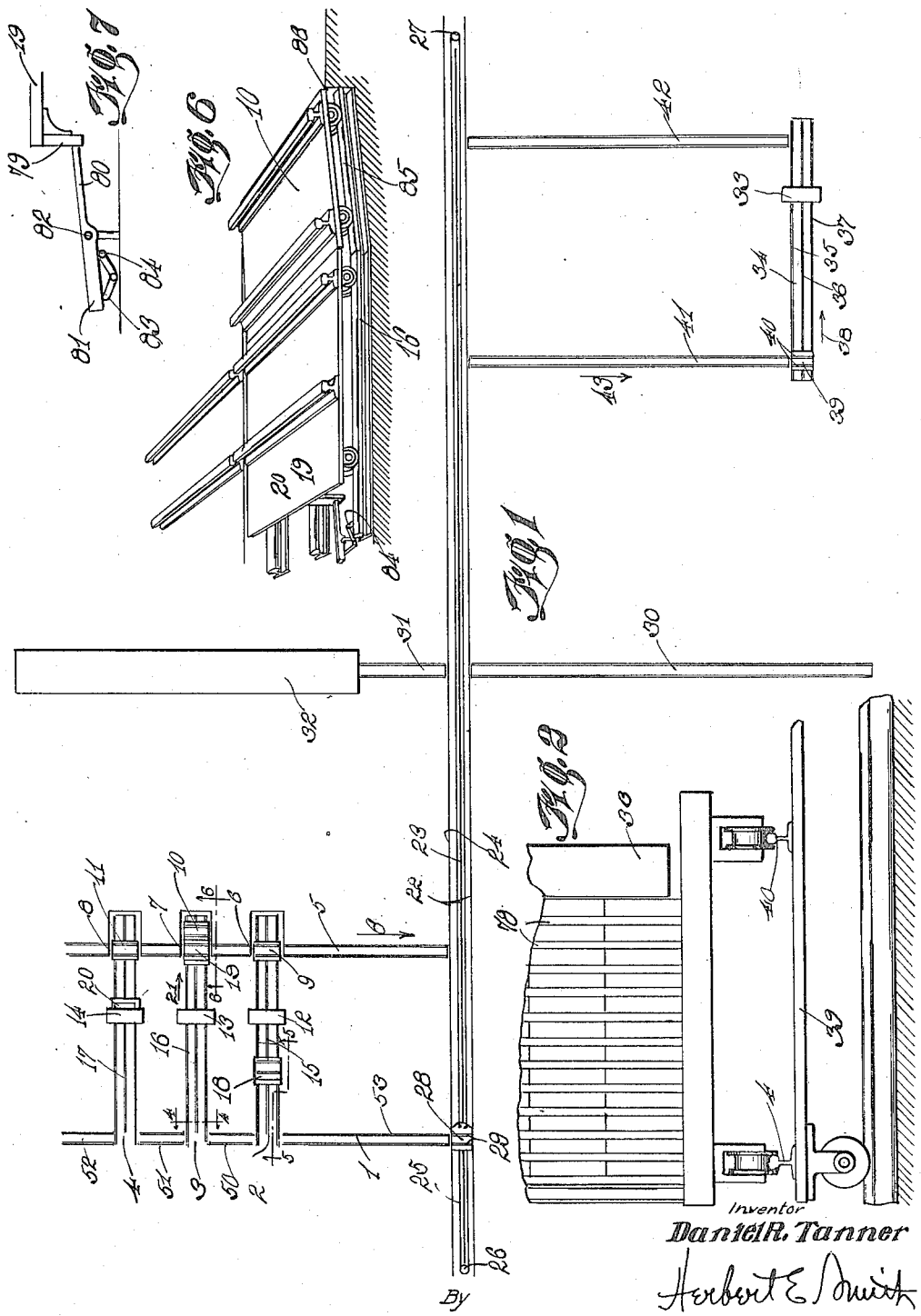

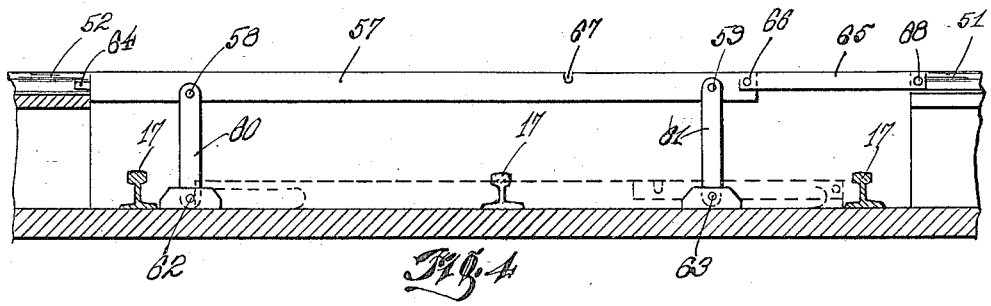
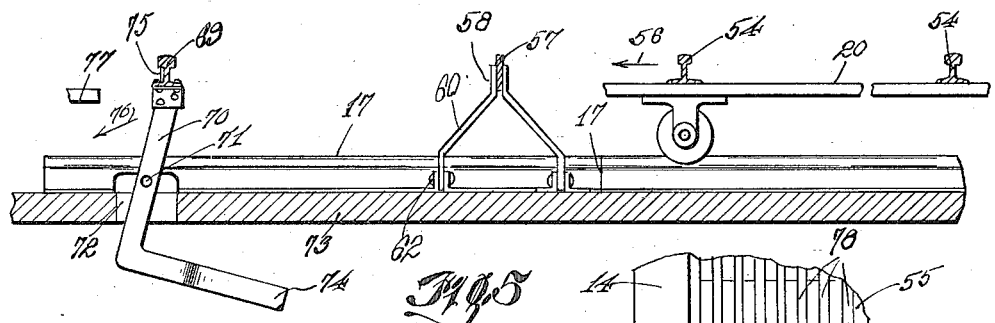
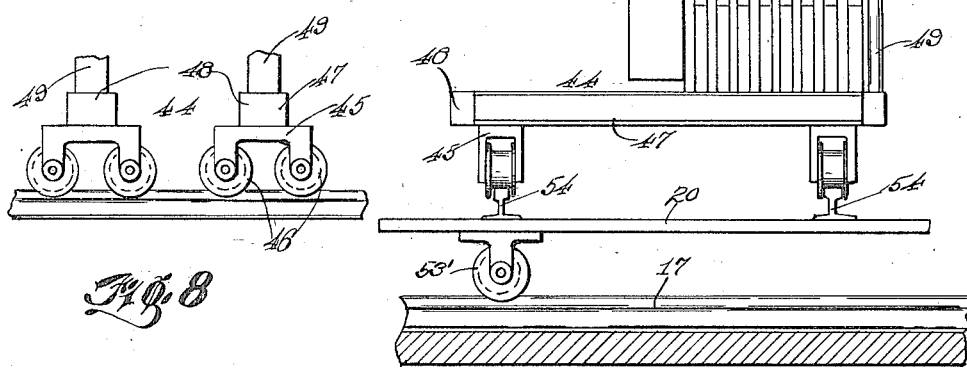

DANIEL R. TANNER, OF LA GRANDE, OREGON.

LUMBER-HANDLING MECHANISM FOR KILN-DRYING.

1,220,797.

Specification of Letters Patent.  Patented Mar. 27, 1917.

Application filed September 2, 1915. Serial No. 48,662.

*To all whom it may concern:*

Be it known that I, DANIEL R. TANNER, a citizen of the United States, residing at La Grande, in the county of Union and State of Oregon, have invented certain new and useful Improvements in Lumber-Handling Mechanism for Kiln-Drying, of which the following is a specification.

This invention relates to improvements in mechanism for handling lumber, and the invention also has to do with an improved method for handling lumber.

It is one of the objects of this invention to provide an improved mechanism including a lumber carrier together with a lumber stacker and a lumber unloader, whereby the carrier may be moved toward and past the lumber stacker to be loaded, and toward and past the unloader to be unloaded, the same truck or carrier being movable on its own wheels, in upright stable condition, back to the lumber loader and being available when in such lumber empty condition, to carry the stakes and stickers back to the loader for future use. Thus throughout a cycle of complete operation, the carrier is caused to perform useful and necessary functions.

In the most improved embodiment of my invention, the carrier is movable toward the lumber stacker to a position for the first step in the loading or stacking operation which is a position in receiving relation, or more particularly speaking, beneath the stacker or loader. As the carrier is stacked or loaded it is gradually advanced with respect to and beneath the loader, and when the stacking or loading operation has been completed, the carrier is moved in the same general direction away from the stacker or loader. Practically the same operation holds true as regards the carrier and the unloader since the loader carrier is moved to a position where its lumber load will abut against and abreast of the unloader, the carrier advancing beneath and away from the unloader during the unloading operation, and finally, at the completion of the unloading operation, the carrier is advanced in the same general direction but away from and free from the unloading mechanism. At this point of the operation, the empty carrier is available for carrying the stakes and stackers back to the loading mechanism or stacker for re-use.

In the most improved embodiment of my invention a system of trackage is employed whereby the carrier may make a complete cycle of operation in a loaded condition from the loading mechanism to a kiln, from the kiln to cooling or other storage points, from such cooling or storage points to the unloading mechanism and back from the unloading mechanism to the loading mechanism, all of which cycle is made upon the wheels of the carrier.

Included in my novel system of trackage, in the most preferred construction, are certain transfer mechanisms whereby a lumber conveyer or carrier may be transferred from one set of transport tracks to another and beneath or past the loader or unloader. The invention also involves a transfer car having transport tracks thereon, the fixed transport tracks at certain points along their length being interrupted by knocked-down sections whereby the transfer car may be advanced into such a position that its transport tracks will register with either of the sets of stationary transport tracks. At certain points, continuity of the transport trackage is maintained, when the transfer car is out of a registering position, by means of false trucks which are provided with transport track sections and which normally seek a position to bring their transport track sections into registry with one set of transport tracks, said false trucks being moved out of such registering position by the transfer car when the latter is moved into a transport track registering position.

My invention includes other novel features which will be more fully described in connection with the accompanying drawings and which will be more fully pointed out in and by the appended claims.

In the drawings:—

Figure 1 is a plan view of my improved system.

Fig. 2 is an enlarged view showing the position of the carrier while it is being unloaded.

Fig. 3 is an enlarged view of the carrier showing the same in the position it would assume while being loaded.

Fig. 4 is a sectional view on line 4—4 of Fig. 1.

Fig. 5 is a sectional view on line 5—5 of Fig. 1.

Fig. 6 is a sectional view on line 6—6 of Fig. 1.

Fig. 7 is an enlarged detail view of an improved locking means for locking one of the transfer cars in a position to hold its transport track sections in registry with one set of transport tracks.

Fig. 8 is an end view of my improved carrier which is shown in the form of independent truck units.

Like characters of reference designate similar parts throughout the different figures of the drawings.

As illustrated, 1 designates a set of transport tracks leading to or toward a battery of loaders or stackers. Said transport tracks are interrupted at 2, 3 and 4 by collapsible sections which will be described in detail later on. A set of transport tracks 5 leads from the battery of loading devices and are preferably inclined downwardly in the direction of arrow 6. The sets of incoming and outgoing transport tracks 1 and 5 are herein shown as being disposed in parallel spaced relation and the outgoing transport tracks 5 are interrupted at 6, 7 and 8 and are provided with false trucks 9, 10 and 11 which will hereinafter be more fully described. A battery of loading devices is indicated at 12, 13 and 14 and the same will preferably, although not necessarily, be in the form of edge stackers as shown more particularly in my copending application filed this 30th day of Sept., 1915, Serial No. 53,346.

Between the sets of transport tracks 1 and 5 I dispose transfer tracks 15, 16 and 17, each transfer track preferably consisting of three rails which are at right angles to the transport tracks 1 and 5 and which intersect the axes of the latter at the points where the collapsible sections and false cars are located. The transfer tracks are preferably at a lower elevation than the transport tracks and I provide for each set of transfer tracks a transfer car as indicated at 18, 19, and 20.

Car 18 may be considered as advancing toward incoming transport rails 1, to receive a lumber carrier, while transfer car 19 is shown in registry with outgoing transport tracks 5. Transfer car 20 is shown in the operation of being loaded. It will be clear by reference to Fig. 1 that false truck 9 preserves continuity of outgoing transport tracks 5 for passage of the loaded carrier or car 19, in the direction of arrow 6. It may be stated at this point that transfer tracks 15, 16 and 17 may be inclined downwardly in the direction of arrow 21, from the loaders toward tracks 5 to facilitate advancing movement of those transfer cars bearing loaded carriers.

At an elevation below transport tracks 1 and 5 I dispose trackage comprising three rails 22, 23 and 24 which extend transversely of the transport tracks and parallel with the transfer tracks. A running endless cable 25 is trained about sheaves 26 and 27 for operating a motive transfer car 28 which is preferably in the form shown in my Patent No. 1,154,315, issued Sept. 21, 1915, entitled Truck transferring mechanism, and therefore as this phase of my invention is not specifically claimed in this application I have not herein shown it in detail. However the motive transfer car is provided with transport track sections 29 for registry with transport tracks 1 and 5 and also for other transport tracks which will presently be described. Furthermore, the motive transfer car 28 has a length or range of travel to and fro such as will bring its sections 29 into registry with any of the transport or conveyer tracks so that carriers may be transferred thereto selectively.

A storage trackage leads laterally from the direction of travel of car 28, as indicated at 30. On this trackage carriers may be stored until a sufficient number has been accumulated to fill a kiln. Kiln trackage 31 leads to a kiln 32, opposite to trackage 30 so that when the car 28 is in registry with tracks 30 and 31 it will render the latter continuous.

An unloading mechanism is indicated at 33 and the same may be of the type shown in my pending application filed on the 21st day of Sept., 1915, Serial No. 51,824. Transfer trackage 34, which may consist of three rails 35, 36 and 37, extends beneath the unloader 33 and laterally therefrom in opposite directions and they may if desired be inclined downwardly in the direction of arrow 38. A transfer car 39 is adapted to be advanced to and fro in any desirable manner along the transfer tracks 34 and is provided with transport track sections 40 for registry with incoming transport or conveyer tracks 41 or return transport or conveyer tracks 42. Transport tracks 41 and 42 extend toward car 28, or rather the range of travel of the latter, so that the sections 29 may be brought into registry with either of tracks 41 or 42. Tracks 41 may be inclined downwardly in the direction of arrow 43 for the purpose of facilitating advancing movement of a loaded carrier onto transfer car 39. After the carriers have been unloaded they may be advanced along tracks 42 in any desired manner.

I will next describe my improved form of lumber carrier which in the preferred construction is composed of independent truck units, as indicated at 44. Each truck unit is provided with a wheel yoke or frame 45 in which bearing wheels 46 are journaled. The yokes or end frames 45 are originally connected by transversely disposed bolsters 47 which may be provided at the ends with stake holders 48 in which stakes 49 are removably mounted. In this connection, I may say that in actual operation, I have obtained the best results by employing take-up stakes such as are shown in the pending application of Irving and Tanner, filed January 19, 1915, Serial No. 3,073. It will be seen that each truck unit is provided with two bearing wheels at each end thereof thereby rendering said truck units self-sustaining and stable for movement in upright positions even if running empty. Furthermore, I find it advantageous to use truck units which are independent of each other and wholly unconnected thereby enabling me to contract or extend the carrier formed by said truck units as occasion may require. In practice, I use three truck units to form a carrier. A further advantage in utilizing independent and unconnected truck units is that fixed sections 50, 51 and 52 may be employed for storing the truck units in contracted and closely spaced relation so as to be readily advanced on any of the transfer cars 18, 19 and 20 thereby permitting me to use the longer section 53 on which to receive the lumber empty carriers loaded with stickers and sticks. It will be understood that when the truck units are returned to section 53, loaded with stickers and stakes, they will present carriers of substantially the length of loaded carriers, or rather carriers having a full load of lumber. Therefore, a great economy of space is possible in providing independent truck units which may be contracted and held on short sections 50, 51 and 52.

I will next describe one of the transfer cars, namely 20, it being understood that all of said cars 18, 19 and 20 are alike in operation and structure.

Said car 20 comprises a platform which is supported by forward and rearward sets of bearing wheels 53', each set comprising three in number for the three rail trackage 17. Upon platform 20 are mounted transport rail sections 54 of a gage identical with the gage of any of the transport tracks so as to register therewith. As the transfer car is advanced below the stacker 14 its stakes will have previously been removed but when the carrier 44 is in a position to receive the first tier of boards 55, the forward stakes 49 will be inserted in place and the stacking operation will proceed, as shown in Fig. 3, with the carrier 44 being advanced gradually by the transfer car 20, by any suitable means, in a direction toward transport tracks 5. I wish to at this point assert the very important feature of this invention which consists in advancing the carrier in one direction toward the loader, and under the same, and away from the loader, this direction being the direction of travel of the carrier toward the point of deposition or next operation. This point of advantage will be strikingly apparent when compared with devices of the prior art wherein it is necessary to advance the carrier in one direction toward the loader, to load the carrier, and then reverse the movement of the carrier away from the loader, after the carrier is loaded. I believe I am the first to move the carrier in one direction toward the loader, to load the carrier, and pass through, or under, the loader while the carrier is being loaded, and finally away from the loader, all in the same direction, after the carrier has been loaded. All of the foregoing applies with equal force and effect as regards the unloading operation.

I will next describe the collapsible sections 2, 3 and 4 whereby transfer cars 18, 19 and 20 may be moved into positions to register their transport rail sections with the transport rails 1, and as all of these sections are identical in operation and construction only one need be described in detail, reference being had more particularly to Figs. 4 and 5.

That collapsible rail section nearest car 20 when the latter is being advanced in the direction of arrow 56, is collapsible longitudinally into a position to allow car 20 to pass to the left of Fig. 5. As illustrated, said section comprises a rail bar 57 which is pivoted at 58 and 59 on links 60 and 61. The links 60 and 61 are pivoted at 62 and 63 so as to permit bar 57 to swing downwardly flat against the flooring as shown in dotted lines in Fig. 4. Rail bar 57 may have extensions 64 to hold the same in registry with rail 52. Said bar 57 is not equal in length to the gap between sections 51 and 52 and the excess length is made up by a folding rail bar 65 which is pivoted to be collapsible with rail bar 57, at 66. The remaining end of bar 65 may be bifurcated to fit on opposite sides of rail section 51 so as not only to hold bar 65 in registry with section 51 but also, to support rail bar 57 in the full line position shown in Fig. 4, so that it will be effectively supported by links 60 and 61. If desired, folding bar 65 may be in the form of two bars adapted to fold on opposite sides of bar 57, a slot 67 being provided to receive a pin 68. However these are mere details of construction and it is understood that the inventive idea is to provide pivotedly connected rail sections, one of which folds bodily out of an operative position, and the other of which breaks joint to fold out of operative position. In order to accommodate this collapsible section, the central rail 17 terminates in advance or to the right of the collapsible rail section, as shown in Fig. 5.

The companion rail member, shown at the left of Fig. 5, comprises a rail section 69 which is equal in length to the gap between sections 51 and 52 and which is mounted upon arms 70 pivoted at 71. Said arms 70 extend through slots 72 in the flooring 73 and are provided with weighted ends 74 to normally hold the arm 70 in the position shown in Fig. 5. In order to prevent rail 69 from swinging too far to the right of Fig. 5, I may provide the rail 69 with a stop bar 75 engaging the outside face of rail section 51. After rail bar 57 has been collapsed, then the car 20 is free to move to the left of Fig. 5 until the end of the platform 20 engages arms 70 whereupon the latter and rail 69 will be swung in the direction of arrow 76 until both of the rails 54 are in registry with rail sections 51 and 52 of track 1. Any suitable stop, as indicated at 77 may be provided to hold car 20 against the too great movement to the left of Fig. 5.

With car 20 in receiving relation with trackage 1, the required number of independent truck units, preferably three in number, will be moved off from the short intermediate sections 52 onto the rails 54 of car 20. Then the transfer car 20 will be moved toward its loader freeing laterally swinging rail 69 and allowing the latter to return automatically into a fixed position. Endwise collapsible rail bar 57 will then be restored to the full line position shown in Fig. 4. The transfer car 20 will then be moved into the position shown in Fig. 3, as hereinbefore described.

After the carrier has been loaded and the stakes 49, fore and aft have been inserted to hold the lumber 55 and the interposed stickers 78 in close relation then the transfer car 20 will be moved into the position of transfer car 19 so that its rail sections 54 will register with transport tracks 5. As car 20 moves into such positions, a depending portion 79 (Fig. 7) will ride over the elevated end of a locking bar 80. The remaining end 81 is weighted and the bar is pivoted at 82. The bar will automatically engage depending stop 79 so as to hold car 20 against movement to the left of Fig. 6. An operating rod is provided with a crank motion 83 for lifting the end 81, and said rod is also provided with a foot crank 84 which is adapted to be depressed by the foot of the operator to release car 20 when it is desired to move said car back toward its loader or stacker.

I will next describe the improved means for maintaining continuity of tracks 5 by means of false trucks or cars, 9, 10, and 11.

Tracks 15, 16 and 17 are inclined upwardly, as indicated more particularly in Fig. 6, as regards tracks 16, at 85. False car 10 will be engaged by transfer car 19 and forced upwardly along the inclined tracks 85 against abutment 86. This will permit the tracks of the transfer car to register with tracks 5 and will shift false car out of registry with tracks 5. The abutment 86 will limit movement of the transfer car to the right of Fig. 6, into a correct position, and the automatic lock shown in Fig. 7 will prevent rebound or reverse movement to the left of Fig. 6, thereby holding the transfer car in a true registry position until it is released. When transfer car is released, and moved to the left of Fig. 6, then false car will automatically roll down inclined track 85 to bring its rails into registry with track 5. The locking device shown in Fig. 7, may, if desired, limit movement of the false car. In some cases I may provide the false car with a gravity controlling weight so that when the weight moves into a final position, it will limit movement of false car 10 to a correct position in registry with rails 5. This however, is a minor feature which I have thought it not necessary to show.

As hereinbefore described, after the carriers are loaded they are moved along tracks 5 on to the motor transfer car 28, which will have been moved into registry with tracks 5, and then the carriers will be, one by one, transferred to storage tracks 30 until the required number has been accumulated to fill the kiln 32. The cars will then all be shifted into the kiln until the lumber is dry. After the lumber has been kilned, it will be shifted out of the kiln onto the motor transfer truck 28 and advanced to incoming tracks 24 and on to transfer truck 39. As the carrier is advanced on transfer truck 39 toward the unloader 33, the tiers of edge stacked lumber will be removed successively and the transfer truck 39 will be gradually advanced, with its carrier, underneath the unloader 33 during this unloading operation. As each tier of edge stacked lumber is unloaded, the stickers 78 will be removed and may be placed in a suitable receptacle. After the carrier has been completely unloaded and moved into a position to the right of the unloader 33, in Fig. 1, then all the stickers and stakes will be deposited upon the carrier and the carrier will be advanced in any suitable manner on tracks 42 up to and on to the car 28 and back to tracks 1 for reuse. Thus the carriers will be advanced through a complete cycle all on their own wheels. When the carriers with their sticks are advanced on tracks 1, the stickers and stakes will be removed and deposited in suitable receptacles accessible to the operator at the top of the loading devices. The means and mechanism for advancing the transfer 39 under the unloader, as the carrier is unloaded, will be more fully described in my above noted pending application specifically directed to the unloading device. Likewise the receptacle for receiving the stickers and stakes adjacent the loading batteries will be more particularly pointed out in my pending application hereinbefore referred to specifically directed to the unloader.

It is now believed that the advantages and utility of my invention will be fully understood from the foregoing description, and while I have herein shown and described one specific form of my invention, I do not wish to be limited thereto except for such limitations as the claims may import.

I claim:—

1. In combination, a system of trackage which includes a main track, an interrupted incoming and an interrupted outgoing transport track in communication therewith and disposed at right angles thereto and upon a plane below the same, said transport tracks being in spaced parallel relation one with the other, a series of transfer tracks disposed upon a plane below said transport tracks at right angles thereto and adapted to connect said transport tracks, collapsible track sections normally registering with said incoming transport track to close the interruptions or gaps in the incoming track, means for opening and closing the interruptions or gaps in said outgoing track; transfer carriers adapted to travel upon said transfer tracks and provided with track sections adapted to register with said transport tracks, load carriers adapted to travel upon said transport tracks and to be transported upon said transfer carriers, and carriers adapted to travel upon said main track to receive and transport said load carriers.

2. In combination, a system of trackage which includes a main track, an interrupted incoming and an interrupted outgoing transport track in communication therewith and disposed at right angles thereto and upon a plane below the same, said transport tracks being in spaced parallel relation one with the other, a series of parallel transfer tracks disposed upon a plane below said transport tracks at right angles thereto and adapted to connect said transport tracks, means for opening and closing the gaps or interruptions in said incoming track, upwardly inclined extensions for said transfer tracks; transfer carriers adapted to travel upon said transfer tracks and provided with track sections adapted to register with said transport tracks, load carriers adapted to travel upon said transport tracks and to be transported upon said transfer carriers, a false track bearing car for each of said transfer tracks adapted to gravitate upon said extensions to register its track with said outgoing transport track, and carriers adapted to travel upon said main track to receive and transport said load carriers.

3. In combination, a system of trackage which includes a main track, an interrupted incoming and an interrupted outgoing transport track in communication therewith and disposed upon a plane below the same, said transport tracks being in spaced parallel relation one with the other, a series of transfer tracks disposed upon a plane below said transport tracks intermediate thereof and adapted to connect the same, transfer carriers adapted to travel upon said transfer tracks and provided with track sections adapted to register with said transport tracks, track sections adapted to open and close the interruptions or gaps in said incoming and outgoing transport tracks independent of the track sections of said transfer carriers, and load carriers adapted to travel upon said transport tracks and to be transported upon said transfer carriers, and carriers adapted to travel upon said main track to receive and transport said load carriers.

4. In combination, a system of trackage which includes an interrupted incoming and an interrupted outgoing transport track, said tracks being in spaced parallel relation, a series of transfer tracks disposed upon a plane below said transport tracks intermediate thereof and adapted to connect the same, transfer carriers adapted to travel upon said transfer tracks and provided with track sections adapted to register with said transport tracks, track sections adapted to open and close the interruptions or gaps in said incoming and outgoing transport tracks independent of the track sections of said transfer carriers, and load carriers adapted to travel upon said transport tracks and to be transported upon said transfer carriers.

In testimony whereof I affix my signature in presence of two witnesses.

DANIEL R. TANNER.

Witnesses:
NELLIE HILLS,
C. H. FINN.